United States Patent [19]

Wang et al.

[11] Patent Number: 5,753,087
[45] Date of Patent: May 19, 1998

[54] MULTI-ELECTRODE CORONA DISCHARGE POLLUTANT DESTRUCTION APPARATUS AND METHOD

[75] Inventors: John H. S. Wang, Rancho Palos Verdes; Weldon S. Williamson, Malibu; Nelson William Sorbo, Redondo Beach; Franklin A. Dolezal, Reseda, all of Calif.

[73] Assignee: Hughes Electronics, Los Angeles, Calif.

[21] Appl. No.: 697,042

[22] Filed: Aug. 19, 1996

[51] Int. Cl.$^6$ ........................................ A62D 3/00
[52] U.S. Cl. ...................... 204/164; 204/174; 204/177; 588/227; 588/243; 588/247
[58] Field of Search ........................... 204/164, 174, 204/177; 588/227, 243, 247

[56] References Cited

U.S. PATENT DOCUMENTS

| | | | |
|---|---|---|---|
| 5,433,832 | 7/1995 | Rich et al. | 204/164 |
| 5,458,748 | 10/1995 | Breault et al. | 204/177 |
| 5,549,795 | 8/1996 | Gregoire et al. | 204/9 |

*Primary Examiner*—Kathryn L. Gorgos
*Assistant Examiner*—Kishor Mayekar
*Attorney, Agent, or Firm*—Gordon R. Lindeen, III; Michael W. Sales; Wanda K. Denson-Low

[57] ABSTRACT

A corona discharge pollutant destruction reactor employs two or more electrodes to enhance the effective corona discharge treatment volume by distributing a varying electric field pattern over the reactor's interior chamber. Appropriate delay circuitry allows the inner electrodes to be driven out of phase with each other by a sinusoidal voltage waveform, or corona producing voltage pulses to be cyclically supplied to the inner electrodes in sequence, preferably without overlapping the pulses.

7 Claims, 4 Drawing Sheets

MULTI-ELECTRODE CORONA DISCHARGE POLLUTANT DESTRUCTION APPARATUS AND METHOD

BACKGROUND OF THE INVENTION

1. Field of the Invention

This invention relates to a corona discharge pollutant destruction reactor chamber with multiple inner electrodes, and a related pollutant destruction method.

2. Description of the Related Art

Passing a pollutant bearing gas through a corona discharge site is a known method of removing the pollutants from the gas. A general review of this technique is provided in Puchkarev et al., "Toxic Gas Decomposition by Surface Discharge," *Proceedings of the 1994 International Conf. on Plasma Science*, 6–8 Jun., 1994, Santa Fe, N. Mex., paper No. 1E6, page 88. Corona pollutant destruction has also been proposed for liquids, as disclosed in application Ser. No. 08/295,959, filed Aug. 25, 1994, "Corona Source for Producing Corona Discharge and Fluid Waste Treatment with Corona Discharge," and assigned to Hughes Aircraft Company, now doing business as Hughes Electronics.

In one system, described in Yamamoto et al., "Decomposition of Volatile Organic Compounds by a Packed Bed Reactor and a Pulsed-Corona Plasma Reactor," *Non-Thermal Plasma Techniques for Pollution Control*, NATO ASI Series Vol. G34 Part B, Ed. by B. M. Penetrante and S. E. Schultheis, Springer-Verlag Berlin Heidelberg, 1993, pages 87–89, brief high voltage pulses of about 120–130 nanoseconds duration are applied to the center conductor of a coaxial corona reactor through which gas is flowing. Each pulse produces a corona discharge that emanates from the center wire and floods the inside volume of the reactor with energetic electrons at about 5–10 keV. A similar system is described in U.S. Pat. No. 4,695,358, in which pulses of positive DC voltage are superimposed upon a DC bias voltage to generate a streamer corona for removing $SO_x$ and $NO_x$ from a gas stream. These processes have relatively poor energy efficiencies. With the reactor geometries that have been selected, it is necessary to deliver very short pulses to avoid arc breakdown between the electrodes, and consequent damage. The pulse-forming circuit loses approximately half of the power coming from a high voltage supply in a charging resistor, and additional energy is wasted in a double spark gap. Furthermore, the capacitive load of the coaxial corona reactor must be charged; this charging energy is typically much greater than the energy that is actually used in the corona reaction, and simply decays away into heat after each pulse without contributing to the pollutant destruction.

A single coaxial inner electrode that is centered along the chamber is capable of generating radial electric field lines to induce charges relatively evenly on the inner surfaces of the dielectric. However, one disadvantage of the coaxial inner electrode is that it is not structurally supported within the chamber and must be suspended from the ends of the chamber. Moreover, when high voltage electricity is applied to the inner electrode, a large amount of heat is produced. The coaxial inner electrode is surrounded only by an exhaust gas, and can thus overheat and burn out after a prolonged exposure to high temperature.

A similar approach, but with a different reactor geometry, is taken in Rosocha et al., "Treatment of Hazardous Organic Wastes Using Silent-Discharge Plasmas," *Non-Thermal Plasma Techniques for Pollution Control*, NATO ASI Series Vol. G34 Part B, Ed. by B. M. Penetrante and S. E. Schultheis, Springer-Verlag Berlin Heidelberg, 1993, pages 79–80, in which the corona discharge is established between parallel plates. This system also suffers from a poor specific energy due to inefficient pulse formation and non-recovery of reactor charging energy.

A block diagram of a generic corona discharge pollutant destruction apparatus is shown in FIG. 1. A corona discharge reactor 102 takes pollutant-bearing exhaust gas 112 from an engine 106 through an inlet conduit 108, treats the exhaust gas, and discharges the treated exhaust gas 114 through an outlet conduit 110. Major pollutants in the exhaust gas 112 from the engine 106 typically include various forms of nitrogen oxides ($NO_x$), hydrocarbons (HC) and carbon monoxide (CO). HC and CO are considered high energy level pollutants, which can be oxidized to produce water ($H_2O$) and carbon dioxide ($CO_2$). $NO_x$ compounds are considered low energy level pollutants, and need to absorb energy to be reduced to harmless diatomic nitrogen ($N_2$) and oxygen ($O_2$). When a power source 104 supplies high voltage pulses to the corona discharge reactor 102, HCs are oxidized to become $H_2O$ and $CO_2$, while CO is oxidized to become $CO_2$. At each voltage peak, a corona discharge is emitted within the reactor 102, producing free radicals that oxidize HC to generate $CO_2$ and $H_2O$, and CO to generate $CO_2$. In general, high voltage pulses in the range of about 10–15 kV are very effective in destroying HC and CO, whereas lower voltage pulses are more suitable for the reduction of $NO_x$.

SUMMARY OF THE INVENTION

The present invention provides two or more inner electrodes for a corona discharge pollutant destruction reactor. The inner electrodes are spatially separated from each other, and are preferably equally placed along the inner surface of a dielectric which defines the reactor's chamber. This facilitates a rapid cycling of the corona discharge throughout the chamber, and producing relatively evenly distributed corona discharges. In one embodiment, two inner electrodes are driven by respective out-of-phase pulsed sinusoidal voltage waveforms to achieve a relatively even distribution of electric field over each cycle. In another embodiment, the voltage pulses are transmitted to each of the inner electrodes in succession, such that at any instant only one inner electrode is charged. All of the inner electrodes are charged sequentially within each pulse repetition period to generate high intensity electric fields that are relatively evenly distributed in the entire volume of the reactor chamber.

These and other features and advantages of the invention will be apparent to those skilled in the art from the following detailed description, taken together with the accompanying drawings, in which:

DETAILED DESCRIPTION OF THE INVENTION

The several disadvantages of the coaxial inner electrode described above can be alleviated by placing an off-axis paraxial wire inner electrode in contact with an inner surface of the dielectric, as described in co-pending application Ser. No. 08/450,449, filed May 25, 1995, "Gaseous Pollutant Destruction Apparatus and Method Using Self-Resonant Corona Discharge," and assigned to Hughes Aircraft Company, now doing business as Hughes Electronics. While the off-axis inner electrode is provided with mechanical support and heat dissipation by the dielectric, the electric field lines emanating from the inner electrode are spaced unevenly within the reactor chamber, causing an uneven distribution of induced electric charges on the inner dielectric surface. Because the charging occurs with different intensity levels within the reactor chamber, the pollutants in an exhaust gas passing through the chamber will not be treated evenly.

The present invention provides a corona discharge pollutant destruction reactor with two or more inner electrodes to generate electric fields from different inner electrodes, resulting in a relatively even generation of corona discharges throughout the reactor chamber. Time separation for charging each of the inner electrodes in a cyclical order is achieved by at least one time delay circuit, which can be either a phase delay circuit or a pulse delay circuit.

Figure 1:
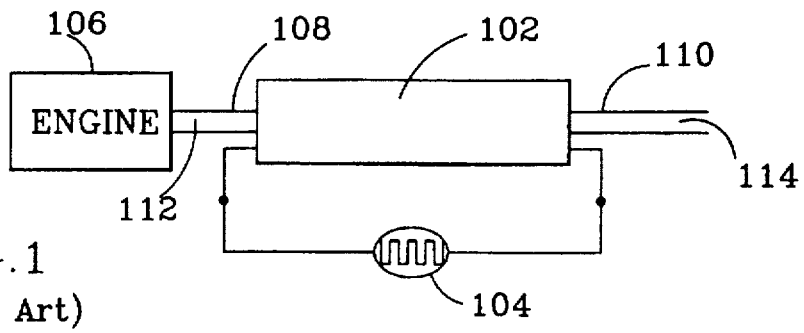
FIG. 1, described above, is a block diagram of a conventional corona discharge pollutant destruction apparatus.
Figure 2A:
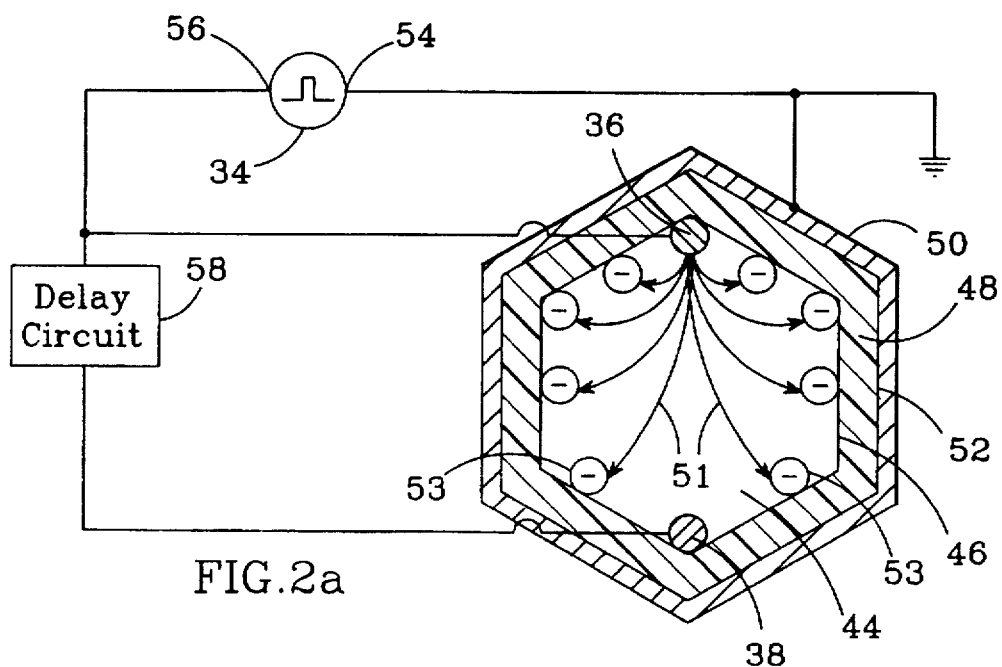
FIG. 2a is a sectional view of a corona discharge reactor having two inner electrodes opposite each other, with a voltage maximum at the first electrode and a voltage null at the second electrode.
Figure 2B:
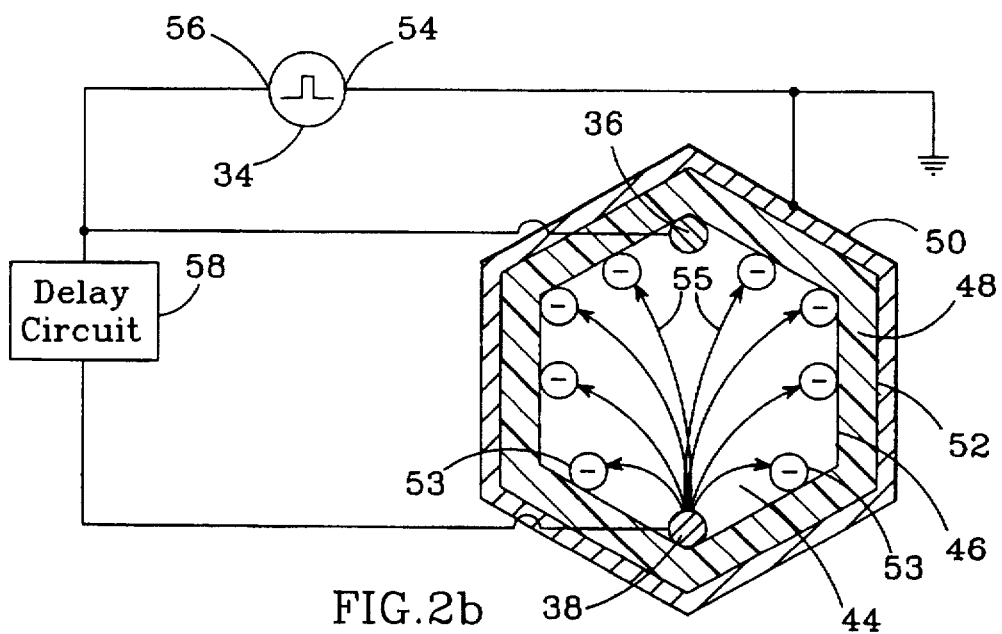
FIG. 2b is a sectional view of the same reactor as in FIG. 2a, but with a voltage maximum at the second inner electrode and a voltage null at the first one.

A preferred embodiment of this invention with two inner electrodes is illustrated in FIGS. 2a and 2b, which show the same cross-sectional view of a reactor system with a phase delay circuit, but with different electric field patterns at different instants of time. A high voltage source 34 drives first and second paraxial inner electrodes 36 and 38 with a typical voltage waveform shown in FIG. 3. It is preferred that the voltage have a substantially sinusoidal waveform 40 modulated by substantially rectangular periodic pulses 42. The signal characteristics that are of most concern to the invention are the voltage level, the pulse width t, the pulse repetition period T and the oscillation frequency. The voltage level generated by the pulsed voltage source 34 is preferably in the range of about 5–15 kilovolts to produce a corona discharge. The average power of the pulse-modulated sinusoidal voltage waveform, and accordingly the average power of the resulting corona discharge, can be adjusted by changing any of the relevant signal characteristics, such as t and T, the ratio of which is defined as the pulse duty cycle. The embodiment illustrated in FIGS. 2a and 2b is also applicable to a corona generation system which uses a continuous-wave voltage source.

The inner electrodes are placed on the inner surface 46 of a hollow dielectric 48 which defines the reactor chamber 44. The inner electrodes are preferably attached to the inner dielectric surface by either bonding or metal vapor deposition to provide thermal dissipation and mechanical support. It is preferred that the reactor chamber have a hexagonal cross-section for strong structural integrity and for close packing of multiple chambers if required. The two inner electrodes 36, 38 are preferably sited along opposite vertices of the reactor chamber 44. The dielectric 48 has an outer surface 52 which is enclosed by a conductive layer that forms an outer electrode 50.

The ground node 54 of the pulsed voltage source 54 is connected to the outer electrode 50; its voltage-carrying node 56 is connected to the first inner electrode 36 directly and to the second inner electrode 38 via a delay circuit 58. In the configuration with two inner electrodes, the delay circuit 58 preferably produces a phase delay so that voltage peaks reach different inner electrodes at different times.

In a preferred embodiment, the phase delay is set at about either 90° or 270° of the oscillation frequency. In FIG. 2a, when the first inner electrode 36 is driven to the maximum positive voltage of the voltage source 34, the second inner electrode 38 is at zero voltage if the phase delay circuit 58 produces either a 90° or a 270° phase delay. The electric field at this time is illustrated by field lines 51 in FIG. 2a. This electric field pattern induces unevenly distributed negative surface charges 53 on the inner surfaces of the dielectric 48, with a greater charge concentration closer to the energized inner electrode 36.

In FIG. 2b, which shows the electric field pattern represented by the field lines 55 in the reactor chamber from FIG. 2a after a time interval equivalent to about 90° for a 90° phase delay circuit or 270° for a 270° phase delay circuit, the voltage at the first inner electrode 36 is nil while the second inner electrode 38 has reached the maximum positive voltage.

The voltage pattern will repeat every 360° for the duration of the pulse. When the voltage on either inner electrode is at a negative rather than a positive maximum, the other electrode is at zero voltage. The directions of the electric field lines 53 would thus be opposite to those shown in FIGS. 2a and 2b, resulting in positive instead of negative surface charges on the inner dielectric surface 46. With the alternating electric field patterns of FIGS. 2a and 2b, the time-averaged charge within the reactor chamber 44 thus become relatively evenly distributed over each sinusoidal period. When a pollutant-bearing gas flows through the reactor chamber, different portions of the gas are subjected to relatively evenly distributed corona discharge within each charging cycle, thereby resulting in a more thorough treatment of the pollutants.

In another embodiment, the delay introduced by the delay circuit 58 is longer than the pulse width, so that the circuit may be considered to be a pulse delay rather than a phase delay circuit. The interval between successive pulses is at least equal to and preferably greater than an individual pulse width, and the delay is selected to place the delayed pulse within this interval so that a pulse is sent to only one of the inner electrodes 36, 38 at a time, in a cyclical order. In this embodiment, the pulse duty cycle is preferably no more than ½. The time-averaged charges would be relatively evenly distributed over each pulse repetition period. Whereas the previous embodiment with a phase delay circuit is applicable to pulse-modulated or continuous-wave sinusoidal voltage waveforms, this embodiment with a pulse delay circuit is applicable to pulse waveforms as well as pulse-modulated sinusoidal waveforms.

Figure 3:
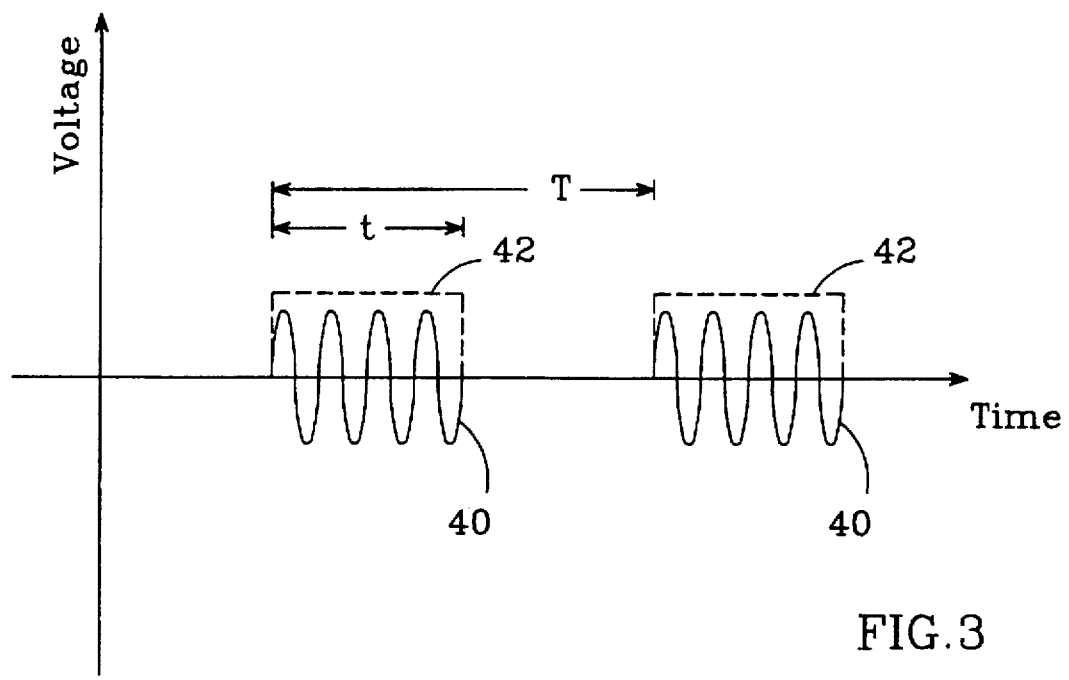
FIG. 3 is a plot of voltage versus time for a typical voltage waveform generated by the pulsed voltage source of FIGS. 2a and 2b.
Figure 4A:
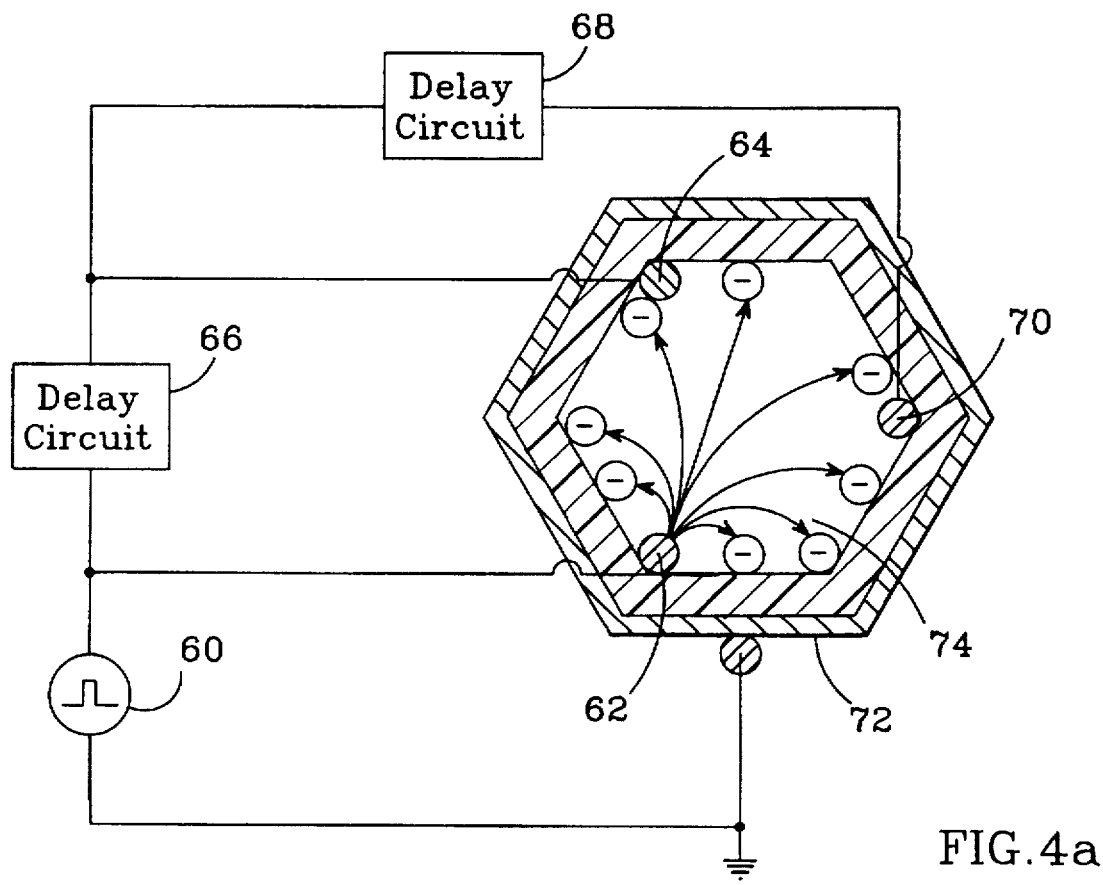
FIG. 4a is a sectional view of a corona discharge reactor having three inner electrodes spaced equally apart from each other, with a pulse applied only to the first electrode.
Figure 4B:
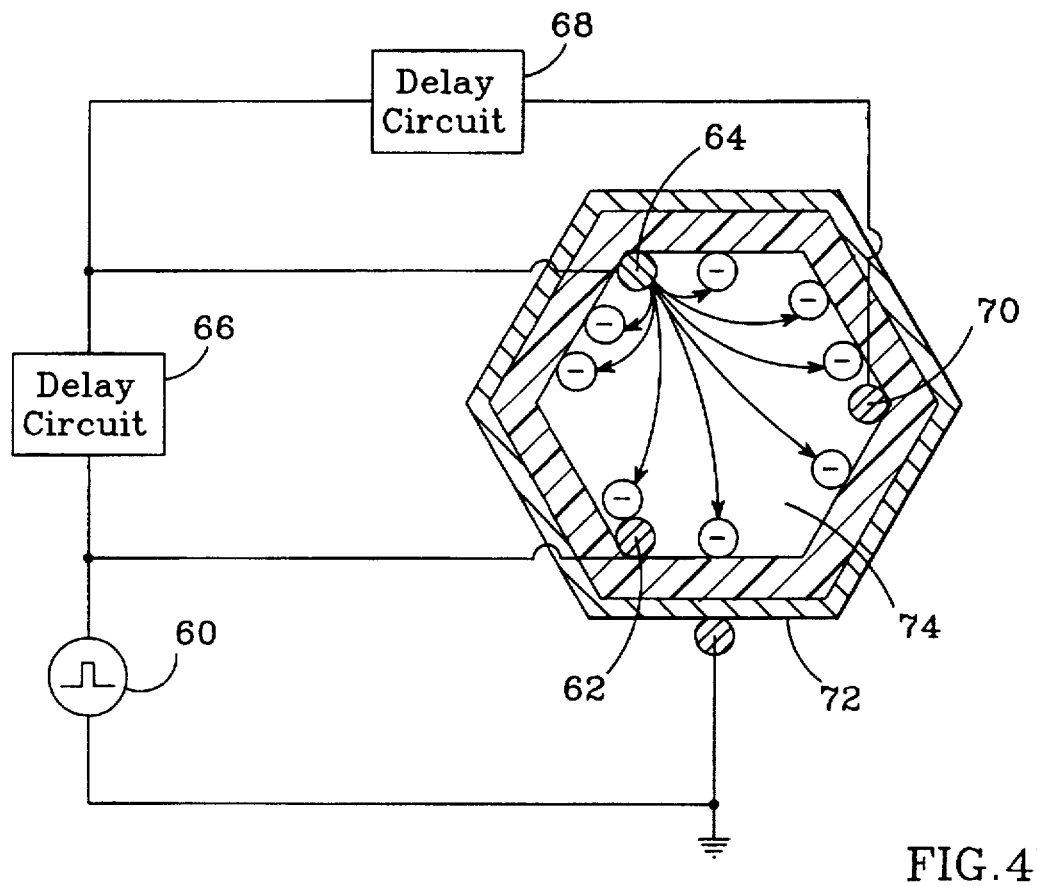
FIG. 4b is a sectional view of the same reactor as in FIG. 4a, but with a pulse applied to the second electrode via a pulse delay circuit.
Figure 4C:
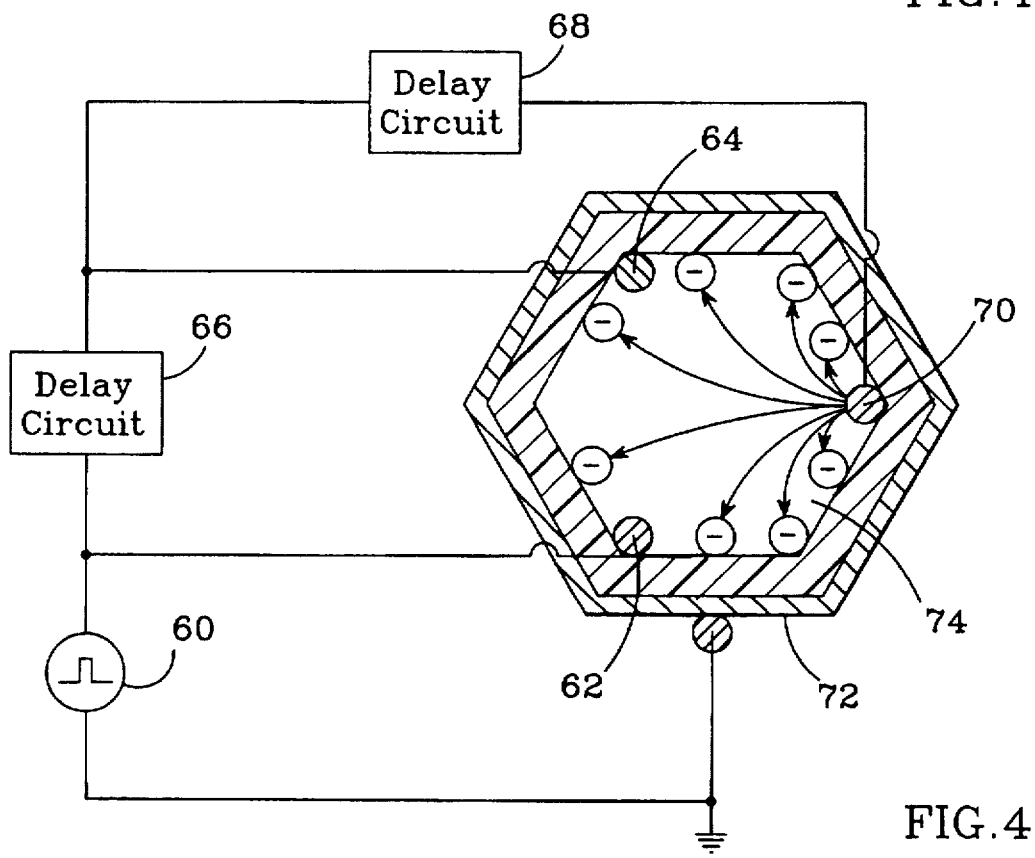
FIG. 4c is a sectional view of the same reactor as in FIG. 4a, but with a pulse applied to the third electrode via two pulse delay circuits in series.

The reactor can employ more than two inner electrodes, such as the three-inner-electrode reactor of FIGS. 4a–4c, in which electrodes 62, 64 and 70 are provided at alternate inner vertices of a hexagonal discharge chamber 74. It is preferred that pulse delay circuits be used to send pulses to the three inner electrodes one at a time. A pulsed voltage source 60 is connected directly to the first electrode 62, and to the second inner electrode 64 via a first pulse delay circuit 66. A second pulse delay circuit 68 is connected in series with the first pulse delay circuit 66 and feeds pulses from the voltage source 60 to the third inner electrode 70; the outer electrode 72 is grounded. The pulsed voltage source preferably generates a pulse-modulated sinusoidal voltage waveform as shown in FIG. 3. To separate the pulses in time so that only one inner electrode at a time is energized, the duty cycle (t/T) should be no more than ⅓. If the duty cycle is set at about ⅓, the delay circuits 66, 68 should each produce a pulse delay equal to t to accurately time the arrival of each pulse at each of the inner electrodes in a sequential order. FIG. 4a illustrates the electric field pattern when a first pulse is sent directly to the first electrode 62. Because the first and second pulse delay circuits 66, 68 delay the arrival of the pulse to the second and third inner electrodes 64, 70, respectively, they are at a voltage null at this time.

After a time delay of t, the pulse arrives at the second inner electrode 64 after passing through the first pulse delay circuit 66, causing the second inner electrode 64 to generate an electric field pattern as illustrated in FIG. 4b. At this time, no pulse is delivered to either the first or the third inner electrodes 62 and 70. After a further time delay of t, the pulse has passed through the first and second pulse delay circuits 66, 68 and arrives at the third inner electrode 70, causing it to generate an electric field pattern as illustrated in FIG. 4c. When the first pulse has finished driving the third inner electrode 70, the voltage source 60 delivers a second pulse to the first inner electrode 62, starting another cycle of driving each of the three inner electrodes successively. Therefore, the time-averaged electric field patterns generated by the three inner electrodes 62, 64, 70 are relatively evenly distributed throughout the reactor chamber 74 over a single pulse repetition period T. Because the inner electrodes are separated only 120° apart, the corona discharge would be more evenly distributed within the reactor chamber than the two-inner-electrode reactor of FIGS. 2a–2b over each pulse repetition period.

For a corona discharge reactor employing more than two inner electrodes, shorter delays that allow pulses to be applied to more than one electrode at a time can also be used. However, there will be instants when two or more inner electrodes have nearly the same voltage, creating equipotential surfaces that reduce the electric field intensities. Nevertheless, the phase delay circuits may still generate cyclical electric field patterns that produce relatively even time-averaged corona discharges throughout the reactor chamber.

Figure 5:
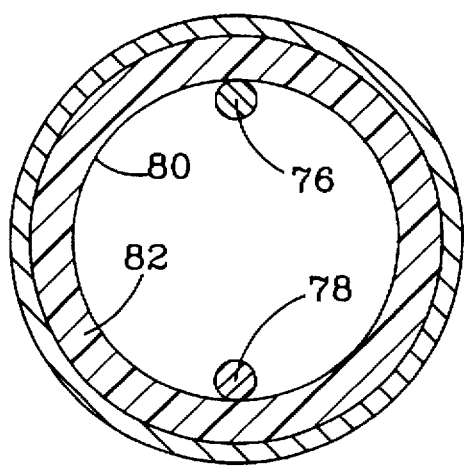
FIG. 5 is a sectional view of a corona discharge reactor with two inner electrodes in a circular reactor chamber.
Figure 6:
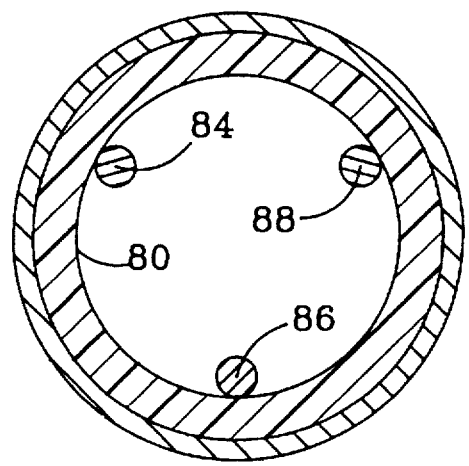
FIG. 6 is a section view of a reactor similar to FIG. 5, but with three inner electrodes.

The multiple inner electrode configuration is also applicable to reactor chambers with circular cross-sections, as shown in FIGS. 5 and 6. In FIG. 5, two inner electrodes 76 and 78 are placed about 180° apart from each other on the inner surface 80 of a circular dielectric cylinder 82. The inner electrodes 76 and 78 are substantially parallel to each other along the length of the cylinder 80. In FIG. 6, three inner electrodes 84, 86 and 88 are separated by about 120° from each other and are also substantially in parallel. Additional inner electrodes can also be provided on the inner dielectric surface to distribute the electric field patterns more evenly.

Figure 7:
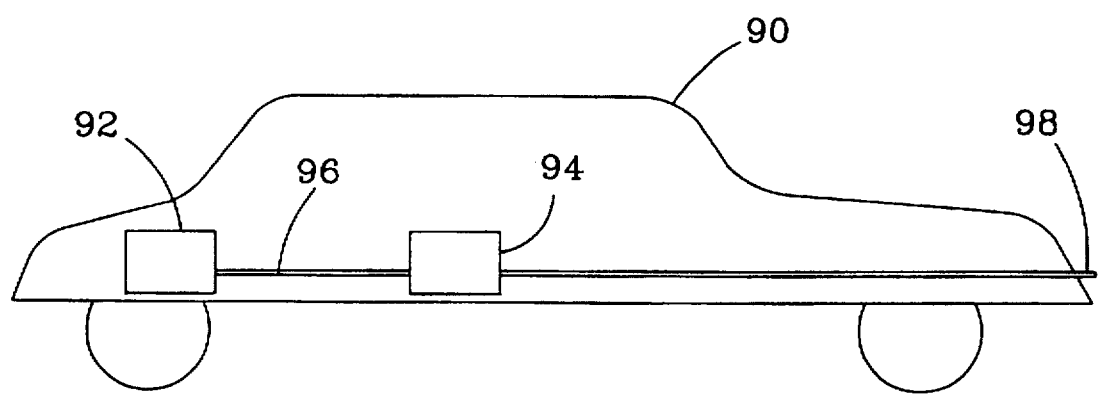
FIG. 7 is a block diagram of an automobile that includes a multi-inner-electrode reactor in accordance with the invention to treat engine exhaust gas.

This invention is applicable to pollutant treatment using corona discharge in automobiles to meet stringent air quality standards. In FIG. 7, an automobile 90 has an internal combustion engine 92 which generates a pollutant-bearing exhaust gas that is conveyed through an engine exhaust pipe 96 to a multi-inner-electrode corona discharge reactor 94, which treats the pollutants in the exhaust gas and releases the treated gas to the atmosphere through a tailpipe 98. The reactor 94 may have any of the configurations shown in FIGS. 2a–2b, 4a–4c, 5 and 6 and described above.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method for generating a distributed corona discharge in a corona discharge pollutant destruction reactor, comprising:

providing a plurality of inner electrodes within said reactor;

supplying time-varying voltages to said inner electrodes; and establishing a variance between the voltages supplied to each of said inner electrodes to generate a corona discharge within said reactor with a time-varying electric field pattern.

2. The method of claim 1, wherein a common time-varying voltage with a substantially sinusoidal waveform is supplied to said inner electrodes, and said variance is established by shifting the phase of said voltage among said electrodes.

3. The method of claim 2, wherein two inner electrodes are provided, and the voltage supplied to one of the inner electrodes is shifted by a phase delay relative to the other electrode.

4. The method of claim 3, wherein said phase delay is about 90 degrees.

5. The method of claim 3, wherein said phase delay is about 270 degrees.

6. The method of claim 1, wherein said time-varying voltage is pulse modulated, and said variance is established by delaying said pulses to at least one of said inner electrodes by at least one pulse duration.

7. The method of claim 6, wherein the voltages supplied to at least some of said inner electrodes are pulse delayed by different amounts so that the inner electrodes are cyclically energized one at a time in a sequential order to generate said time-varying electric field pattern.

* * * * *